United States Patent
Cawood et al.

(10) Patent No.: US 11,215,053 B2
(45) Date of Patent: Jan. 4, 2022

(54) ADAPTED GROUT DELIVERY SLEEVE

(71) Applicant: NCM INNOVATIONS (PTY) LTD, Johannesburg (ZA)

(72) Inventors: Martin Cawood, Johannesburg (ZA); Henri Visser, Johannesburg (ZA); Adrian Berghorst, Johannesburg (ZA)

(73) Assignee: NCM INNOVATIONS (PTY) LTD, Johannesburg (ZA)

( * ) Notice: Subject to any disclaimer, the term of this patent is extended or adjusted under 35 U.S.C. 154(b) by 0 days.

(21) Appl. No.: 16/644,619

(22) PCT Filed: Sep. 7, 2018

(86) PCT No.: PCT/ZA2018/050053
§ 371 (c)(1),
(2) Date: Mar. 5, 2020

(87) PCT Pub. No.: WO2019/051512
PCT Pub. Date: Mar. 14, 2019

(65) Prior Publication Data
US 2021/0071525 A1   Mar. 11, 2021

(30) Foreign Application Priority Data
Sep. 7, 2017  (ZA) ................. 2017/06087

(51) Int. Cl.
*E21D 20/02* (2006.01)
*E21D 21/00* (2006.01)

(52) U.S. Cl.
CPC ........ *E21D 21/0033* (2013.01); *E21D 20/028* (2013.01); *E21D 21/008* (2013.01)

(58) Field of Classification Search
CPC .................................................. E21D 21/0033
See application file for complete search history.

(56) References Cited

U.S. PATENT DOCUMENTS 4,656,806 A * 4/1987 Leibhard ............... F16B 13/065
52/704
5,088,866 A * 2/1992 Ischebeck ............. F16B 31/028
116/212

(Continued)

FOREIGN PATENT DOCUMENTS

AU   2016101727 A4   11/2016
CA   2490111 A1 * 12/2003 ......... E21D 21/0033

(Continued)

OTHER PUBLICATIONS

International Search Report, dated Mar. 11, 2018, from corresponding PCT application No. PCT/ZA2018/050053.

*Primary Examiner* — Janine M Kreck
(74) *Attorney, Agent, or Firm* — Nixon & Vanderhye

(57) ABSTRACT

A rock anchor assembly includes: a tubular sleeve between first and second ends, having an anchor retaining portion opening on the second end; a rock anchor with an elongate body extending between distal and proximal ends, received in the tubular sleeve with the proximal and distal ends of the body projecting from the first and second ends respectively of the sleeve; a tensioning and locking assemblage on the anchor body between the proximal end and the first end of the sleeve, a forward part being engageable with the first end of the sleeve; and a mechanical anchor engaged to the anchor body at the distal end which, from an unexpanded configuration, expands radially to an expanded configuration. The anchor retaining portion at least partially retains the mechanical anchor in the unexpanded configuration. The anchor retaining portion expands circumferentially to accommodate retracted ingress of the anchor in the expanded configuration.

10 Claims, 4 Drawing Sheets

(56) References Cited

U.S. PATENT DOCUMENTS 9,470,088 B2 * 10/2016 Ahola .................... E21D 21/008
2012/0177448 A1 * 7/2012 Steyn .................... E21D 20/028
　　　　　　　　　　　　　　　　　　　　　　405/259.5

FOREIGN PATENT DOCUMENTS

| WO | 2011/020144 A1 | 2/2011 |
| WO | 2016/210456 A2 | 12/2016 |
| WO | 2017/120633 A1 | 7/2017 |
| ZA | 201604248 B | 7/2017 |

* cited by examiner

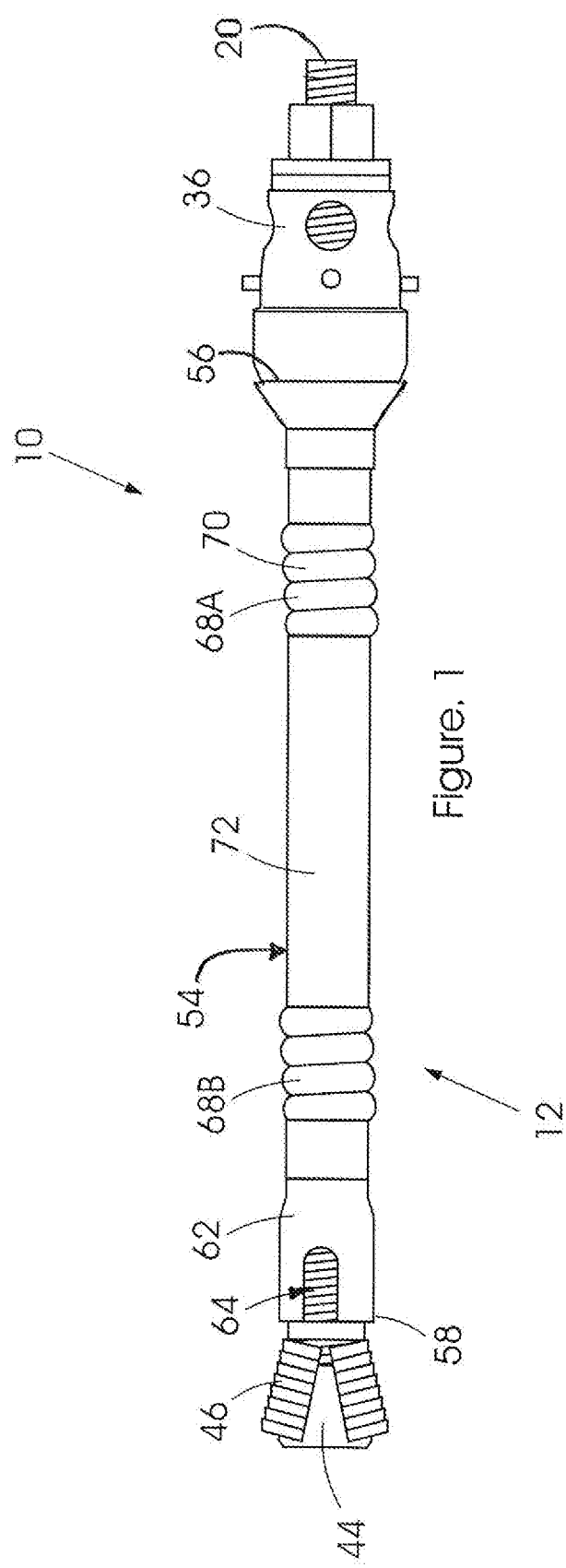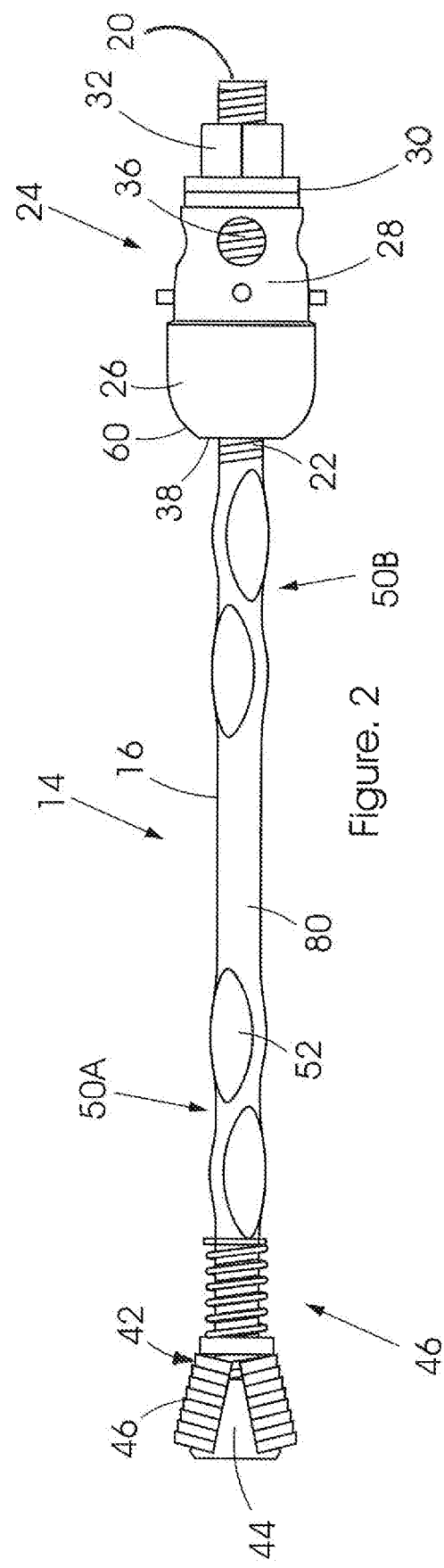

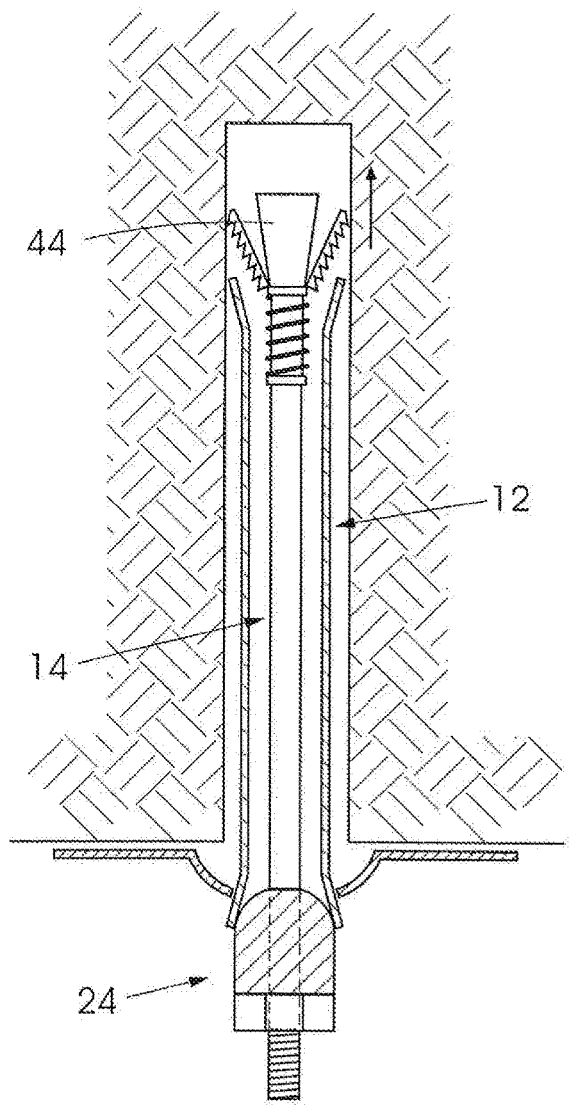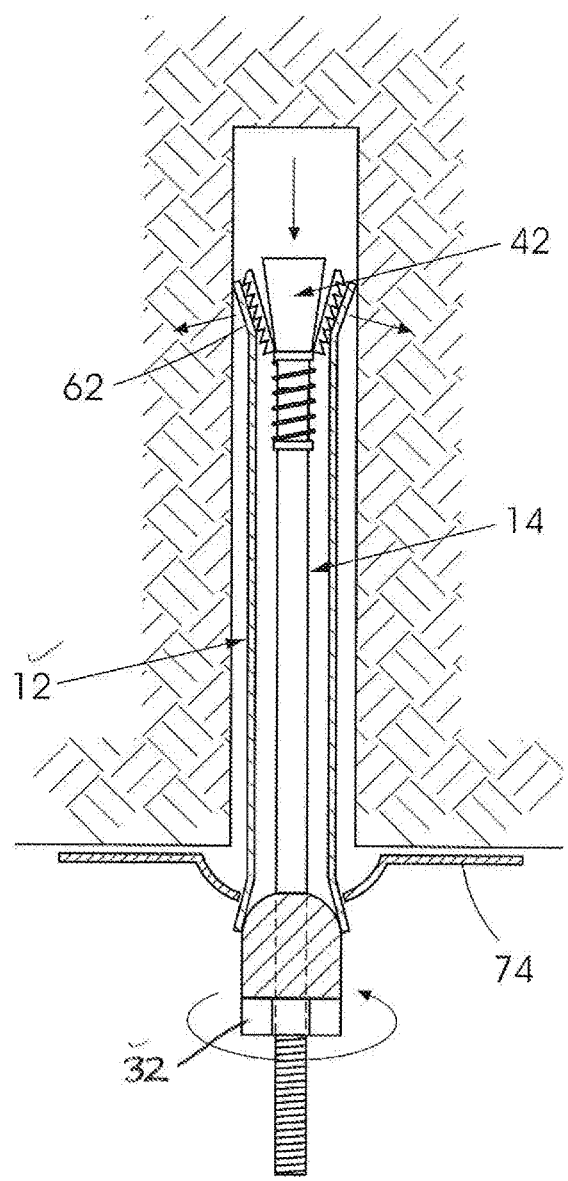
Figure. 3B
Figure. 3C

US 11,215,053 B2

ADAPTED GROUT DELIVERY SLEEVE

FIELD OF THE INVENTION

The invention relates to a rock anchor assembly for grouting in a rock hole and more specifically to an improved grout sleeve of the assembly.

BACKGROUND OF INVENTION

Hereinafter a rock anchor is used to describe both a rigid rock bolt and a flexible cable anchor.

In grouted rock anchor installations, such as an installation using the assembly described in the specification ZA 2016/04248, which is herein incorporated by reference, the mechanical anchor at the end of the rock anchor often fails to resistively engage the walls of a rock hole in which the rock anchor is engaged. This can occur, for example, when the rock walls are soft and the anchor shell sloughs off a layer of the rock and so fails to gain purchase.

This problem can result in the anchor being pulled back into a leading end of the grout sleeve, rendering the mechanical anchor inutile.

Another problem with such an assembly is that the rock anchor body, within the grout sleeve, is capable of de-bonding from the grout encasing, at least partially along its length. With the sleeve of the assembly having a profiled outer surface along its entire length, no part of the sleeve can de-bond. This can result in the anchor body stretching to accommodate load whilst the sleeve remains rigidly encased within its grout encasement, incapable of de-bonding and elongating under the same load. The sleeve can tear or break as a result.

The invention at least partially solves the aforementioned problems.

SUMMARY OF INVENTION

One aspect of the invention provides a rock anchor assembly which includes:

a tubular sleeve which extends between a first end and a second end and which has anchor retaining portion which opens on the second end;

a rock anchor with an elongate body which extends between a distal end and a proximal end and which is received in the tubular sleeve with the proximal and distal ends of the body projecting from the first and second ends respectively of the sleeve;

a tensioning and locking assemblage on the anchor body between the proximal end and the first end of the sleeve, a forward part of which is engageable with the first end of the sleeve; and a mechanical anchor engaged to the anchor body at the distal end which, from an unexpanded configuration, is radially expansible to an expanded configuration;

wherein the anchor retaining portion is adapted to at least partially retain the mechanical anchor in the unexpanded configuration; and wherein the anchor retaining portion is adapted to expand circumferentially to accommodate retracted ingress of the anchor in the expanded configuration.

The anchor retaining portion may include at least one expansionary formation about which the portion deforms or breaks to circumferentially expand.

Preferably the retaining portion has a plurality of expansionary formations. More preferably these expansionary formations are equally radially spaced about the retaining formation.

Each expansionary formation may be a slot formed in the wall of the retaining portion. Each slot may open on the second end.

Alternatively, each expansionary formation may include a weakened wall portion which separates each slot from the second end.

An outer surface of the sleeve may be formed with at least a pair of spaced resistive zones.

Each resistive zone may be located adjacent a proximal or distal end of the sleeve.

The outer surface of the sleeve, at each resistive zone, may be profiled.

The outer surface of the sleeve may have a de-bonding portion which has a smooth cylindrical surface. The de-boding portion may be between the resistive zones.

The de-bonding portion may be longer than the resistive zones.

Preferably, the rock anchor is formed with a plurality of spaced resistive anchors, these anchors being located with the sleeve.

The tensioning and locking assemblage may include a barrel and a wedge or a spherical seat and a nut.

The tensioning and locking assemblage may include at least one grout conduit through which grout is pumped into the sleeve.

The mechanical anchor may be adapted to move from the unexpanded configuration, when circumferentially constrained, to the expanded configuration, when free from circumferential constraint.

In another aspect, the invention provides a rock anchor assembly which includes:

a tubular sleeve which extends between a first end and a second end;

a rock anchor with an elongate body which extends between a distal end and a proximal end, which is formed with at least one resistive anchor, and which is received in the tubular sleeve with the proximal and distal ends of the body projecting from the first and second ends respectively of the sleeve;

a tensioning and locking assemblage on the anchor body between the proximal end and the first end of the sleeve, a forward part of which is adapted to engage the first end of the sleeve; and a mechanical anchor engaged with the anchor body at the distal end;

wherein an outer surface of the sleeve is formed with at least a pair of resistive zones; and wherein, between the zones, the outer surface has a de-bonding portion which has a smooth cylindrical surface.

Each resistive zone may be located adjacent a respective proximal or distal end of the sleeve.

The de-bonding portion may be longer than either of the resistive zones.

The outer surface of the sleeve, at each resistive zone, may be profiled.

Preferably, the rock anchor is formed with a plurality of spaced resistive anchors, these anchors being located with the sleeve.

BRIEF DESCRIPTION OF THE DRAWINGS

The invention is described with reference to the following drawings in which:

FIG. 1 is an orthographic view of a rock anchor assembly in accordance with the invention;

FIG. 2 is an orthographic view of a rock bolt of the assembly;

FIGS. 3A to 3C diagrammatically illustrate in sequence the stages in the installation of the rock anchor assembly.

DESCRIPTION OF PREFERRED EMBODIMENTS

Figure 3A:
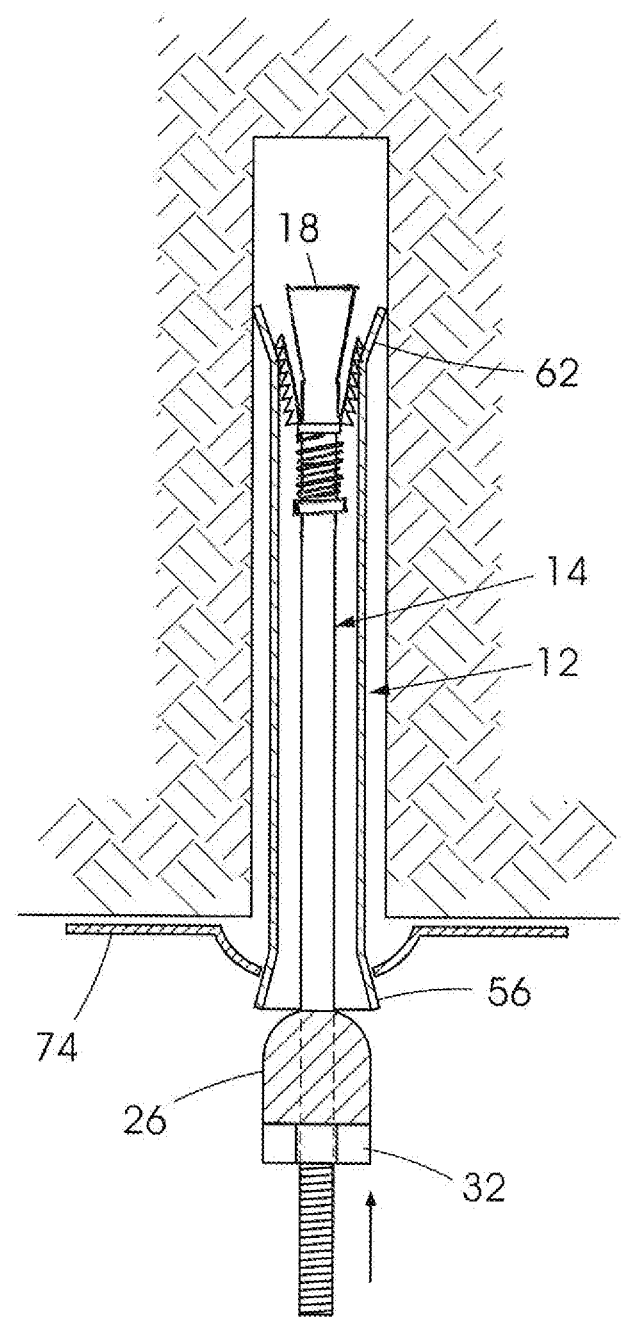

FIG. 1 illustrates a rock anchor assembly 10 which includes an improved grout sleeve 12.

The rock anchor assembly includes two major components; a rock anchor 14 and the grout sleeve 12. The rock anchor can be a rigid rock bolt, such as that illustrated, or a cable anchor.

The rock bolt 14 has an elongate cylindrical steel body 16 which extends between a distal end 18 and a proximal end 20. The body has a threaded proximal end portion 22 on which a tensioning and locking assembly 24 is threadedly engaged. This assemblage, as described in the specification to ZA 2016/04248 and only described here by way of a non-limiting example, includes a barrel 26, coupling member 28, a load indicator 30 and a tensioning nut 32. The functioning of the assemblage will not be described further, save that the assemblage includes a grout conduit 34 (see FIG. 4) which opens at a grout inlet port 36 and a grout outlet 38. It is through the conduit that grout is pumped from a source (not shown) and through the sleeve, to an interior of a rock hole when the assembly is inserted in the rock hole.

On a distal end portion, the rock bolt 14 carries a mechanical anchor 42. The anchor can be of any suitable configuration that is actuated to expand by the movement of a wedge formation 44, on the distal end 18 of bolt, into an expansible shell 46 which comprises a circumferential array of leaves.

The bolt body 16 is formed with a pair of paddle anchors, respectively designated 50A and 50B. Each pair of paddle anchors comprises two end to end paddles 52, each of which lies in a plane which is radially offset relatively to the other.

The grout sleeve 12 has a generally cylindrical body 54 which extends between a first end 56 and a second end 58. In this example, the first end is flared to receive a forward end 60 of the barrel 26 of the tensioning and locking assemblage 24. At the opposed end, the sleeve includes an anchor retaining portion 62 which is circumferential larger than the rest of the sleeve.

The anchor retaining portion 62 includes a pair of diametrically opposed U shaped slots 64 that are formed, by any suitable method, through the wall of the portion.

The rock bolt 14 passes through the sleeve, in assembly of the anchor assembly 10, with part of the distal end portion and the proximal end portion 22 of the bolt body projecting from the second end 58 and first end 56 of the sleeve respectively.

An outer surface 66 of the sleeve 12 has a pair of spaced resistive zones, respectively designated 68A and 68B, biased in positioning towards the first end and second end (56, 58) respectively. Along each resistive zone, the outer surface is profiled with a spiral rib 70. Between the resistive zones, the outer surface is smooth, providing a de-bonding portion 72.

Prior to inserting the assembly 10 in a rock hole, in use, a faceplate 74 is engaged, passing over the assembly 10 from the distal end 18 to rest on the flared end first end 56 of the sleeve. See FIG. 3A. The mechanical anchor 42 is partially held in an unexpanded configuration within the anchor retaining portion 62.

Inserting the assembly 10 in a predrilled rock hole, distal end 18 leading, the faceplate 74 will contact the rock wall preventing the sleeve 12 from moving further into the hole. However, the rock bolt 14 is free to move in an axial direction within the sleeve and thus move deeper into the rock hole. Pushing the bolt inwardly, to move the forward end 59 of the barrel 26 into nested contact with the flared first end 56 of the sleeve, will push the anchor from the retaining portion 62 allowing the shell to move over the wedge formation 44 into an expanded configuration and into resistive contact with the walls of the rock hole to anchor the bolt in the rock hole as is illustrated in FIG. 3B.

Once this occurs, the rock bolt 14 can be tensioned by applying torque to the tensioning nut. This step is illustrated in FIG. 3C.

Grout can be introduced at this stage, through the grout conduit 34, entering the sleeve at the flared first end 56. The grout will fill the interior of the sleeve before exiting the sleeve at the second end 58, cascading into the annular space between the outer surface of the sleeve 66 and the rock hole walls.

However in certain rock type, before grouting, the mechanical anchor may not resistively engage the rock hole walls. This failure will allow the mechanical anchor to be pulled back into the anchor retaining portion 62 of the sleeve. The slots 64 provide expansionary formations about which the portion 62 can circumferentially expand to accommodate ingress of the now fully expanded mechanical anchor. By providing a means for circumferential expansion, the slots allow the retaining portion 60 to act as part of the mechanical anchor akin to the leaves of the expansionary shell. With the additional dimension that the wall of the portion 62 provides to the anchor, the combined retaining portion/mechanical anchor will come into resistive contact with the rock wall to anchor the rock bolt. FIG. 3C also illustrates this retractive step.

Figure 4:
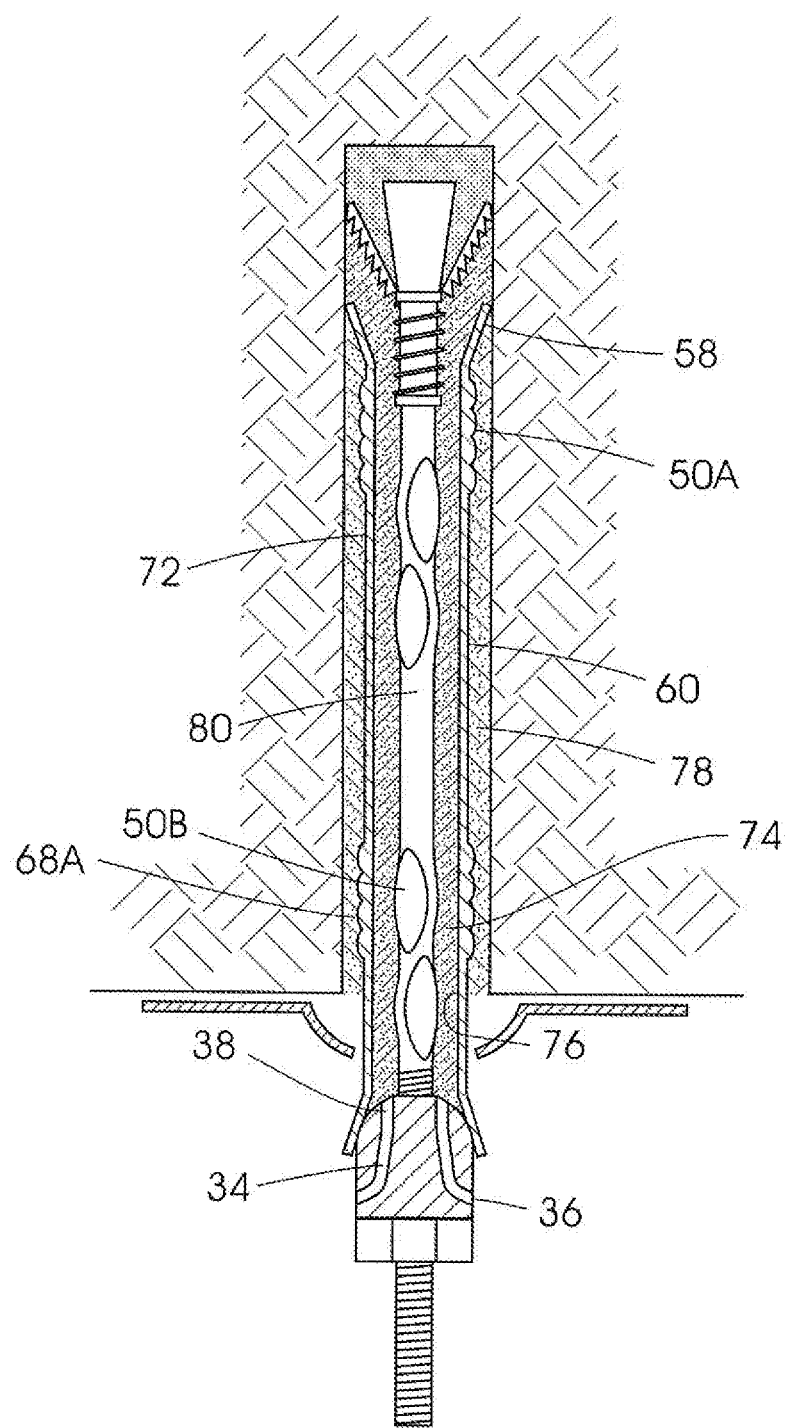
FIG. 4 diagrammatically illustrates the rock anchor assembly installed in a rock hole and grouted therein.

In describing the second aspect of the invention, with reference to FIG. 4, the rock anchor assembly 10, installed within a rock hole and grouted therein, defines two discrete grout columns: a first column 74 between the rock bolt 14 and an inner surface 76 of the sleeve; and the second column 78 between outer surface 60 of the sleeve and the walls of the rock hole. When fully grouted, each of these columns is filled or partially filled, with grout.

Within the first grout column 74, the rock bolt 14 can move relatively to the sleeve 12, with the paddle anchors (50A and 50B) anchoring into the grout of this column, allowing a smooth stem portion 80, between the paddle anchors 50, to de-bond from the grout and supportively elongate under progressive load.

Without the adaptations of the first aspect of the invention, the grout sleeve would have a profiled outer surface along its entire length. With the rock bolt contained within the sleeve able to de-bond and elongate, the sleeve would not be able to accommodate this elongation, bonded as it is along the entire length within the grout contained in the second column.

However, with the adaptations of the first aspect, the sleeve is able to resistively anchor within the second column grout by the first and second resistive ones. With the de-bonding portion analogous with the stem portion, the sleeve can de-bond along this portion and elongate to accommodate the elongation of the enclosed rock bolt. Damage to the sleeve, by breaking or cracking, is avoided with concomitant benefit.

The invention claimed is:

1. A rock anchor assembly which includes a tubular sleeve which extends between a first end and a second end and which has anchor retaining portion which opens on the second end and which is adapted to circumferentially expand, a rock anchor with an elongate body which extends between a distal end and a proximal end and which is received in the tubular sleeve with the proximal and distal ends of the body projecting from the first and second ends respectively of the sleeve, a barrel and wedge or a spherical seat and a nut on the anchor body between the proximal end and the first end of the sleeve, a forward part of the barrel or the spherical seat is engageable with the first end of the sleeve, and a mechanical anchor engaged to the anchor body at the distal end that is retained in the anchor retaining portion in an unexpanded configuration, that is radially expansible to an expanded configuration when moved from the anchor retaining portion and that remains in the expanded configuration when retracted into the anchor retaining portion by circumferential expansion of the anchor retaining portion to accommodate ingress of the anchor, wherein an outer surface of the sleeve is formed with at least a pair of spaced resistive zones, with a de-bonding portion having a smooth cylindrical surface between the resistive zones, and wherein the rock anchor is formed with a plurality of spaced resistive anchors, these anchors being located within the sleeve.

2. The rock anchor assembly according to claim 1 wherein the anchor retaining portion includes at least one expansionary formation about which the portion deforms or breaks to circumferentially expand.

3. The rock anchor assembly according to claim 2 wherein the at least one expansionary formation is a slot formed in the wall of the retaining portion.

4. The rock anchor assembly according to claim 3 wherein the at least one slot opens on the second end.

5. The rock anchor assembly according to claim 3 wherein the at least one expansionary formation includes a weakened wall portion which separates each slot from the second end.

6. The rock anchor assembly according to claim 1 wherein each resistive zone is located adjacent a proximal or distal end of the sleeve.

7. The rock anchor assembly according to claim 6, wherein each resistive zone is profiled.

8. The rock anchor assembly according to claim 1 wherein each resistive zone is profiled.

9. The rock anchor assembly according to claim 1 wherein the de-bonding portion is longer than the resistive zones.

10. The rock anchor assembly according to claim 1 wherein the barrel or the spherical seat includes at least one grout conduit through which grout is pumped.

* * * * *